(12) United States Patent
Chaudhury et al.

(10) Patent No.: US 7,720,782 B2
(45) Date of Patent: May 18, 2010

(54) AUTOMATED PREDICTIVE MODELING OF BUSINESS FUTURE EVENTS BASED ON HISTORICAL DATA

(75) Inventors: Jayatu Sen Chaudhury, Edison, NJ (US); Amber Gupta, Gurgaon (IN); Prasanta Sahu, Jersey City, NJ (US); Tirthankar Choudhuri, Gurgaon (IN)

(73) Assignee: American Express Travel Related Services Company, Inc., New York, NY (US)

( * ) Notice: Subject to any disclaimer, the term of this patent is extended or adjusted under 35 U.S.C. 154(b) by 373 days.

(21) Appl. No.: 11/615,703

(22) Filed: Dec. 22, 2006

(65) Prior Publication Data

US 2008/0154814 A1 Jun. 26, 2008

(51) Int. Cl.
*G06N 5/02* (2006.01)
*G06F 15/18* (2006.01)
(52) U.S. Cl. ........................................ 706/46
(58) Field of Classification Search ................ None
See application file for complete search history.

(56) References Cited

U.S. PATENT DOCUMENTS

| | | | | |
|---|---|---|---|---|
| 6,480,832 | B2 * | 11/2002 | Nakisa | 706/13 |
| 7,039,654 | B1 * | 5/2006 | Eder | 707/104.1 |
| 7,283,982 | B2 * | 10/2007 | Pednault | 706/12 |
| 7,328,182 | B1 * | 2/2008 | Yahil et al. | 705/36 R |
| 7,401,057 | B2 * | 7/2008 | Eder | 706/20 |
| 2001/0044766 | A1 * | 11/2001 | Keyes | 705/36 |
| 2004/0167765 | A1 * | 8/2004 | Abu El Ata | 703/22 |
| 2005/0234753 | A1 * | 10/2005 | Pinto et al. | 705/7 |

OTHER PUBLICATIONS

*Business Intelligence Products & Performance Management Services—Fair Isaac*, from http://www.fairisaac.com/fic/en/product-service/Products-Services-Search.htm?f1=&f2=&f3={5C6C..., 3 pages, Copyright 2007, printed May 8, 2007.
*InfoCentricity: Analytics at the Speed of Business*, from http://www.infocentricity.com/products.html, 2 pages, printed May 1, 2007.
*Our Approach: Scoring & Predictive Analytics*, from http://www.fairisaac.com/fic/en/our-approach/scoring-and-predictive-analytics/, 4 pages, Copyright 2007, printed May 8, 2007.
*Products & Services: Behavior Models*, from http://www.fairisaac.com/fic/en/product-service/product-index/behavior-models/, 5 pages, Copyright 2007, printed May 8, 2007.

(Continued)

*Primary Examiner*—David R Vincent
*Assistant Examiner*—Ola Olude-Afolabi
(74) *Attorney, Agent, or Firm*—Snell & Wilmer L.L.P.

(57) ABSTRACT

Predictive models are developed automatically for a plurality of modeling variables. The plurality of modeling variables is transformed, based on a transformation rule. A clustering of the transformed modeling variables is performed to create variable clusters. A set of variables is selected from the variable clusters based on a selection rule. A regression of the set of variables is performed to determine prediction variables. The prediction variables are utilized in developing a predictive model. The development of the predictive model may include modification of the predictive model, review of the plurality of transformations, and validation of the predictive model.

19 Claims, 6 Drawing Sheets

OTHER PUBLICATIONS

*Products & Services: Custom Credit Bureau Models*, from http://www.fairisaac.com/fic/en/product-service/product-index/custom-credit-bureau-models/, 4 pages, Copyright 2007, printed May 8, 2007.

*Products & Services: Model Builder*, from http://www.fairisaac.com/fic/en/product-service/product-index/model-builder/, 6 pages, Copyright 2007, printed May 8, 2007.

* cited by examiner

AUTOMATED PREDICTIVE MODELING OF BUSINESS FUTURE EVENTS BASED ON HISTORICAL DATA

BACKGROUND OF THE INVENTION

1. Field of the Invention

The present invention generally relates to statistical modeling and analysis. More particularly, the invention relates to development of predictive models.

2. Background Art

Statistical modeling and analysis replaced the use of rule-based decision making during the last decade. Predictive modeling is a form of statistical analysis that is increasingly being used in customer management, underwriting, assessment of business patterns, customer loyalty, product portfolio performances, pricing variations, and so forth. Predictive modeling involves development of mathematical constructs that enable reliable prediction of future events or measurements based on historical information. The results may further be exploited for decision-making, which is related to the profitability of an organization.

Prediction of future events or measurements of a problem under investigation is performed by analyzing modeling variables. The modeling variables are related to different attributes and characteristics of the problem. The number of modeling variables utilized for predictive modeling has grown exponentially over the past few years. In some cases, the number of modeling variables may be up to 10,000 or even more. This leads to increased time and resource requirements for predictive modeling.

Further, it is essential to identify the relationship between a dependent variable and the modeling variables. The manual development of predictive models makes the identification difficult and leads to inclusion of redundant modeling variables. The inclusion of redundant modeling variables may lead to incorrect parameter estimation, increased computation time, confounding interpretations, and increased time requirement for building a predictive model. The manual development may also require more time.

Given the foregoing, what is needed is a method to reduce time requirements for predictive modeling. Further, the method should develop predictive models without manual intervention. The method should also enable manual modification and verification of the developed predictive models.

BRIEF SUMMARY OF THE INVENTION

The present invention meets the needs identified above by providing a method, system and computer program product for predictive analysis.

An advantage of the present invention is that it performs an automatic development of predictive models for a plurality of modeling variables.

Another advantage of the present invention is that it automatically performs a plurality of transformations for the plurality of modeling variables.

Another advantage of the present invention is that it automatically performs a selection of the transformed modeling variables.

Yet another advantage of the present invention is that it automatically performs a regression of the selected variables.

Still another advantage of the present invention is that it performs a preparation of a predictive model.

The invention presents a method, system and computer program product for automatically developing predictive models, for a plurality of modeling variables. The plurality of modeling variables is transformed and a transformation is selected, based on a transformation rule. A clustering of the transformed modeling variables is performed to create variable clusters. The variable clusters so created are checked for adequate representation of all the different attributes that should be present in a given model. This ensures a proper representation of different types of variables and a reduction of the modeling bias in the later steps of the model building process. Thereafter, a set of variables is selected from variable clusters, based on a selection rule. A regression of the set of variables is performed for determining prediction variables. A predictive model is then prepared utilizing the prediction variables. The preparation of the predictive model may also include modification of the predictive model, review of transformations of the modeling variables, and validation of the predictive model.

BRIEF DESCRIPTION OF THE DRAWINGS/FIGURES

The features and advantages of the present invention will become more apparent from the detailed description set forth below, when taken in conjunction with the drawings, in which like reference numbers indicate identical or functionally similar elements. Additionally, the left-most digit of a reference number identifies the drawing in which the reference number first appears.

DETAILED DESCRIPTION OF THE INVENTION

I. Overview

The present invention is directed to a method, system and computer program product for developing predictive models. Predictive models are developed automatically for a plurality of modeling variables. A plurality of transformations is generated for each of the plurality of modeling variables. A transformation is selected for each of the plurality of modeling variables, based on a transformation rule. A clustering of the transformed modeling variables is performed to create variable clusters. A set of variables are selected from the variable clusters, based on a selection rule. A regression of the set of variables is performed for determining prediction variables. A predictive model is then prepared utilizing these prediction variables. The preparation of the predictive model may also include modification of the predictive model, review of the plurality of transformations, and validation of the predictive model.

The present invention is now described in more detail herein in terms of the above-mentioned exemplary embodiment. This is for convenience only and is not intended to limit the application of the present invention. In fact, after reading the following description, it will be apparent to one skilled in the relevant art(s) how the following invention can be implemented in alternative embodiments, e.g., in the various software and hardware platforms being used, the mode of implementation of the invention, the end use of the invention, etc.

II. System

Figure 1:
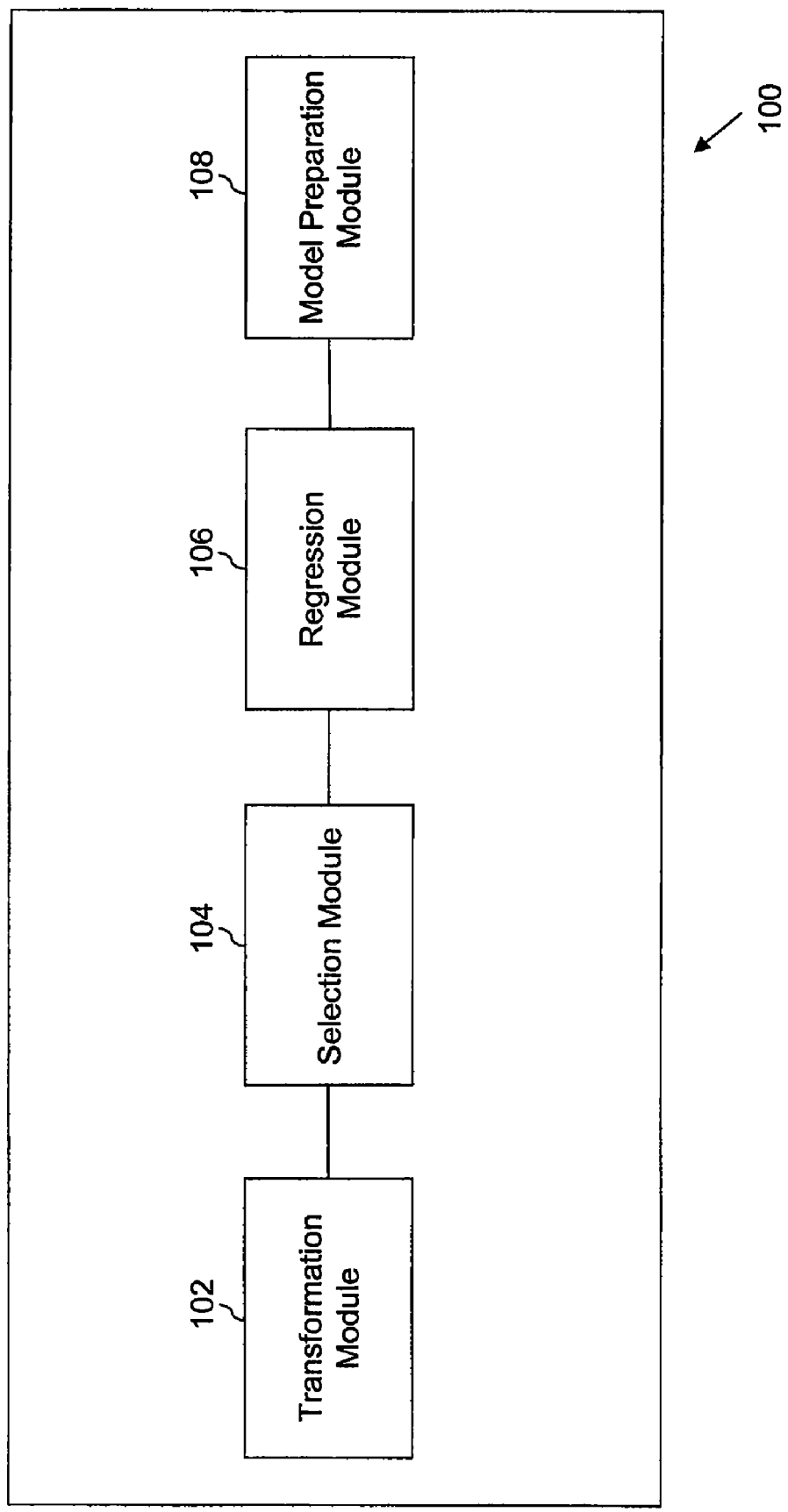
FIG. 1 is a block diagram of an exemplary system for developing predictive models, in accordance with an embodiment of the invention.

FIG. 1 is a block diagram providing an overview of an exemplary system 100. In an embodiment of the invention, system 100 performs development of predictive models utilizing a plurality of modeling variables. System 100 includes a transformation module 102, a selection module 104, a regression module 106, and a model preparation module 108.

System 100 may be supported by a statistical analysis software. In accordance with an embodiment of the invention, the statistical analysis software may be a SAS® Statistical Software, available from SAS Institute Inc., Cary, N.C. The SAS® Statistical Software assists users in developing predictive models.

Transformation module 102 automatically transforms a plurality of modeling variables. Examples of transformations include linear, logarithmic, square root, and so forth. Transformation module 102 generates a plurality of transformations for each of the plurality of modeling variables. A transformation is selected for each of the plurality of modeling variables by transformation module 102, based on a transformation rule.

Selection module 104 automatically selects a set of variables from the transformed modeling variables, based on a selection rule. Selection module 104 performs a clustering of the transformed modeling variables for creating variable clusters. The set of variables is selected from the variable clusters based on the selection rule.

Regression module 106 performs an automatic regression of the set of variables. The regression: is performed for determining prediction variables. The prediction variables are used in preparing the predictive model.

Model preparation module 108 prepares the predictive model based on the prediction variables. Model preparation module 108 also enables a user to perform modification of the predictive model, review of the plurality of transformations of the plurality of modeling variables, and validation of the predictive model.

III. Process

Figure 2:
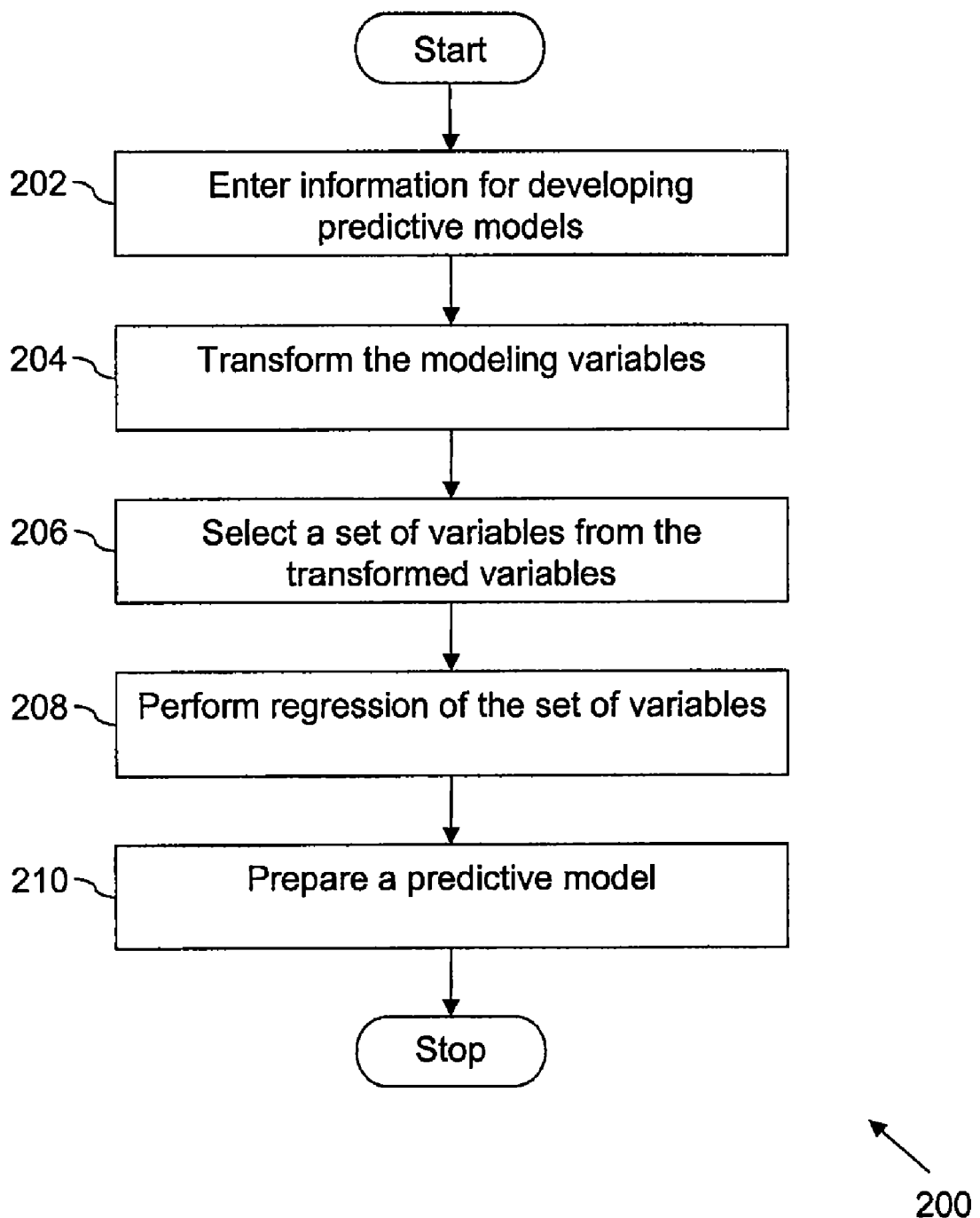
FIG. 2 is a flowchart illustrating a process for developing predictive models, in accordance with an embodiment of the invention.

FIG. 2 is a flowchart illustrating a process 200 for developing predictive models, in accordance with an embodiment of the invention. In various embodiments of the invention, process 200 is implemented by using a statistical analysis software.

At step 202, the information required for developing predictive models is entered. In an embodiment of the invention, the information includes a plurality of modeling variables, a dependent variable, and a dataset for the plurality of modeling variables. In an embodiment of the invention, the dependent variable may be a bivariate variable. In an alternative embodiment of the invention, the dependent variable may be a continuous variable.

At step 204, the plurality of modeling variables are transformed. The transformation is performed to obtain a linear relationship of each of the plurality of modeling variables, in relation to the dependent variable. In an embodiment of the invention, a plurality of transformations may be generated for each modeling variable. In an embodiment of the invention, the transformations are stored in a memory device for future reference.

A transformation is selected for each modeling variable, from the plurality of transformations, based on a transformation rule. In an embodiment of the invention, the transformation rule is based on a correlation between the modeling variable and the dependent variable. The transformation rule is also based on a proportion of a range of the modeling variable utilized, and a proportion of a range of the dependent variable that is explained by the modeling variable.

At step 206, a set of variables is selected from the transformed modeling variables. In an embodiment of the invention, a clustering of the transformed modeling variables is performed to create variable clusters. The set of variables is selected from the variable clusters, based on a selection rule. In an embodiment of the invention, one variable is selected from each variable cluster.

In an embodiment of the invention, the selection rule is based on a correlation between a transformed variable and the dependent variable, and a proportion of a range of the dependent variable explained by the transformed variable.

In an alternative embodiment of the invention, the selection rule is based on a log-likelihood difference. The loglikehood difference is the difference between two model-fit statistics, one being derived by utilizing an intercept model, and the other being derived by utilizing an intercept-plus-covariate model.

At step 208, a regression of the set of variables is performed. The regression is performed for determining prediction variables. In an embodiment of the invention, a stepwise regression is performed.

In an embodiment of the invention, a logistic regression may be performed. In an alternative embodiment of the invention, an Ordinary Least Squares (OLS) regression may be performed.

At step 210, a predictive model is prepared by utilizing the prediction variables obtained from regression. In an embodiment of the invention, the preparation of the predictive model includes reviewing the transformations of the plurality of modeling variables and validating the predictive model. In an embodiment of the invention, the preparation of the predictive models further includes a modification of the predictive model.

IV. Example Implementation

Figure 3:
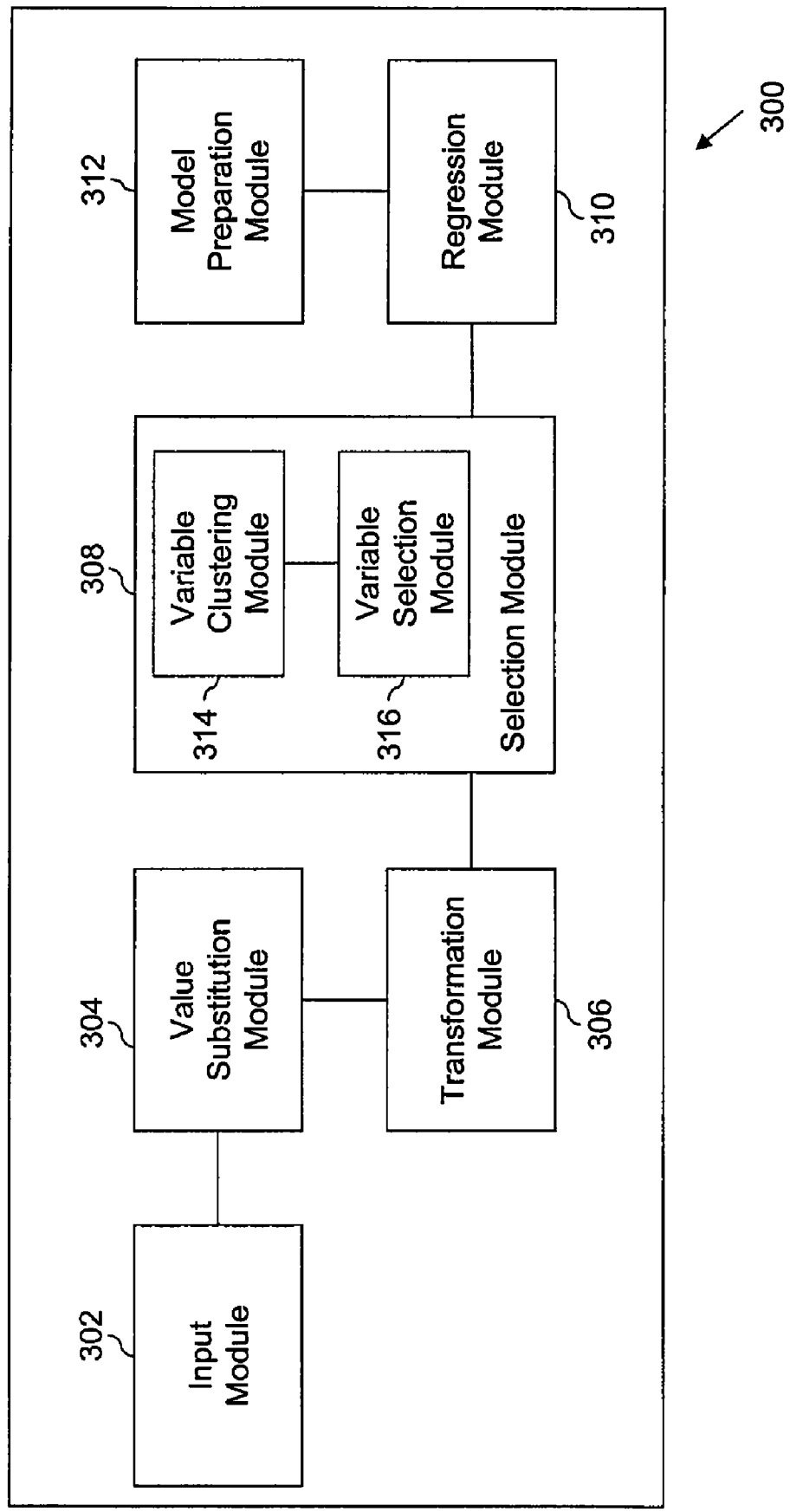
FIG. 3 is a block diagram of an exemplary system for developing predictive models, in accordance with an alternative embodiment of the invention.

FIG. 3 is a block diagram providing a detailed view of an exemplary system 300. System 300 is supported by the SAS® Statistical Software as described above.

System 300 includes an input module 302, a value substitution module 304, a transformation module 306, a selection module 308, a regression module 310, and a model preparation module 312.

Input module 302 enables entering information required for developing predictive models. In an embodiment of the invention, the information includes a plurality of modeling variables, a dependent variable, and a dataset for the modeling variables. In an embodiment of the invention, the information is input manually. In an alternative embodiment of the invention, the information is entered automatically.

In an embodiment of the invention, the dependent variable is a bivariate variable. In an alternative embodiment of the invention, the dependent variable is a continuous variable.

Value substitution module 304 performs a substitution of values in the dataset for the modeling variables. In an embodiment of the invention, the substitution may be performed for at least one of missing values, invalid values, and/or zero values.

In an embodiment of the invention, the missing values for a modeling variable may be substituted by the minimum value of the modeling variable in the dataset. In an alternative embodiment of the invention, the missing values may be substituted by a replacement value. The replacement value is computed automatically based on the relationship between the dependent variable and the modeling variable. The relationship may be derived by excluding values of the dependent variable that correspond to the missing values.

In an embodiment of the invention, the invalid values may be substituted by the minimum value of the modeling variable in the dataset. In an alternative embodiment of the invention, the invalid values may be substituted by the maximum value of the modeling variable in the dataset. In another alternative embodiment of the invention, the invalid values may be substituted by a replacement value. The replacement value is computed automatically based on the relationship between the dependent variable and the modeling variable. The relationship may be derived by excluding values of the dependent variable that correspond to the invalid values.

In an embodiment of the invention, the zero values may be substituted by the minimum value of the modeling variable in the dataset. In an alternative embodiment of the invention, the zero values may be substituted by a replacement value. The replacement value is computed automatically based on the relationship between the dependent variable and the modeling variable. The relationship may be derived by excluding values of the dependent variable that correspond to the zero values.

Transformation module 306 automatically transforms the plurality of modeling variables. In various embodiments of the invention, the transformation includes generation of bivariate ranks and plots.

In an embodiment of the invention, a plurality of bivariate ranks and plots are generated between the dependent variable and each of the modeling variables. In an embodiment of the invention, the plurality of bivariate ranks and plots may be stored for future reference.

In an embodiment of the invention, the plurality of bivariate ranks and plots are utilized for splitting the dataset for each modeling variable into a plurality of buckets. In an embodiment of the invention, the dataset for each modeling variable is split into, for example, twenty equal-sized buckets. In an alternative embodiment of the invention, the dataset for each modeling variable is split into a user-specified number of equal-sized buckets. The equal-sized buckets are utilized for generating a plurality of transformations for the modeling variables. The generation of a plurality of transformations is described in conjunction with FIG. 4.

In an embodiment of the invention, for each modeling variable, a transformation may be selected from the plurality of transformations, based on a transformation rule.

In an embodiment of the invention, the transformation rule for a modeling variable is based on a correlation between a modeling variable and a dependent variable, Corr; a proportion of a range of the modeling variable utilized, RangeM; and a proportion of a range of the dependent variable that is explained by the modeling variable, RangeExp. In an alternative embodiment of the invention, the transformation rule is based on a log-likelihood difference.

In an embodiment of the invention, the transformation rule leads to the selection of the transformation which has the highest value of a transformation selection statistic, TranStat. In an embodiment of the invention, TranStat is given by the following equation:

$$\text{TranStat} = \text{Corr}^2 * \text{RangeExp} * \sqrt{\text{RangeM}} \qquad 1$$

Corr may be calculated as a linear correlation between the dependent variable and the modeling variable. In an embodiment of the invention, Corr is equal to a Pearson product-moment correlation coefficient.

In an alternative embodiment of the invention, three transformations may be selected, based on the transformation rule. The selection of the transformation is further described in conjunction with FIG. 5.

Selection module 308 automatically selects a set of variables from the transformed modeling variables, based on a selection rule. Selection module 308 includes a variable clustering module 314 and a variable selection module 316.

Variable clustering module 314 performs a clustering of the transformed modeling variables. The clustering is performed to create variable clusters. The transformed modeling variables in each variable cluster are correlated amongst themselves. The transformed modeling variables in a variable cluster are less correlated with the variables in other variable clusters. The clustering is supported by a variable clustering algorithm.

In an embodiment of the invention, the variable clustering algorithm is PROC VARCLUS. The PROC VARCLUS variable clustering algorithm is supported by the SAS® Statistical Software. Additional information about the SAS® Statistical Software and about PROC VARCLUS is available at http://www.sas.com. The algorithm divides the modeling variables into either disjoint or hierarchical variable clusters. Each variable cluster is associated with a linear combination of the modeling variables present in the variable cluster. The linear combination may either be a first principal component or a centroid component. The first principal component is a weighted average of the modeling variables that explains the maximum possible variance. The centroid component is an unweighted average of the modeling variables. The algorithm maximizes the sum of variances across variable clusters to obtain the resulting variable clusters for selection of a set of variables.

Variable selection module 316 selects the set of variables from the variable clusters, based on a selection rule. In an embodiment of the invention, one variable may be selected from each variable cluster.

In an embodiment of the invention, the selection rule is based on a correlation between a transformed modeling variable and the dependent variable, CorrTran, and the proportion of the range of the dependent variable explained by the transformed modeling variable, RangeTran. In an alternative embodiment of the invention, the selection rule is based on a log-likelihood difference.

In an embodiment of the invention, one variable is selected from one variable cluster based on the selection rule. The selection rule leads to the selection of a variable, which has the highest value of a variable selection statistic, SelectStat, in the variable cluster.

In an embodiment of the invention, SelectStat is given by the following equation:

$$\text{SelectStat} = \text{CorrTran} * \text{RangeTran} \qquad 2$$

CorrTran may be calculated as a linear correlation between the dependent variable and the transformed variable. In an embodiment of the invention, CorrTran is equal to a Pearson product-moment correlation coefficient.

Regression module 310 performs a regression of the set of variables selected by variable selection module 316. The regression is performed for determining prediction variables.

In an embodiment of the invention, stepwise regression is performed for determining the prediction variables.

In an embodiment of the invention, an OLS regression is performed. The OLS regression is supported by a PROC REG regression algorithm provided by SAS® Statistical Software. In an alternative embodiment of the invention, a logistic regression is performed. The logistic regression is supported by a PROC LOGISTIC regression algorithm provided by SAS® Statistical Software.

In an embodiment of the invention, the regression provides a partial R-square value, a regression coefficient, a Student's t-test value, a p-value, and a Variable Inflation Factor (VIF), as an output for the set of selected modeling variables. The partial R-square value measures the marginal contribution of a variable upon an inclusion of the variable in the model. The Student's t-test value and the p-value denote the statistical significance of the variable. The VIF denotes redundancy of a modeling variable in the model. For example, a high value of VIF denotes that the modeling variable is correlated to at least one other modeling variable in the model, and the modeling variable is therefore redundant and removed from the model.

Model preparation module 312 enables a preparation of a predictive model. The predictive model may be prepared by using the prediction variables, and the regression coefficients from regression module 310.

In an embodiment of the invention, modification of the predictive model is performed manually. The modification of the predictive model may be performed by adding or removing the predictive variables.

In an alternative embodiment of the invention, model preparation module 312 enables a manual review of the plurality of transformations generated by transformation module 306.

Figure 4:
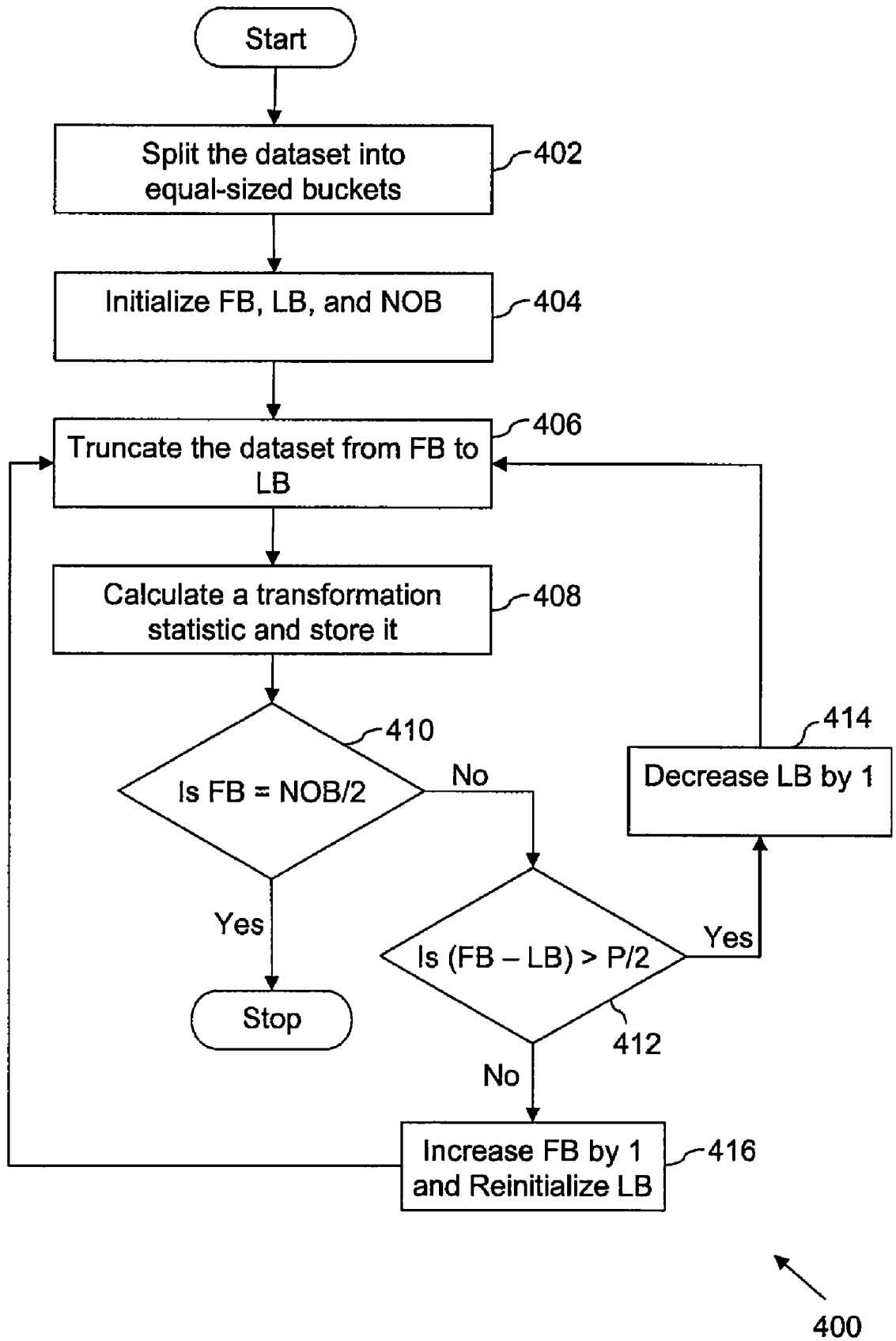
FIG. 4 is a flowchart illustrating a process for generating a plurality of transformations, in accordance with an embodiment of the invention.

In an alternative embodiment of the invention, model preparation module 312 enables a validation of the predictive model. FIG. 4 is a flowchart illustrating a process for generating a plurality of transformations, in accordance with an embodiment of the invention.

At step 402, the dataset for a modeling variable is split into a set of equal-sized buckets. In an embodiment of the invention, the dataset is split, for example, into twenty equal-sized buckets. The bivariate ranks and plots, as described in conjunction with FIG. 3, are utilized for splitting the dataset.

At step 404, some counters are initialized. In an embodiment of the invention, the counters may be a first bucket number (FB), a last bucket number (LB), and a total number of buckets (NOB). For example, in case the total number of buckets is twenty, then a value 'one' is assigned to FB, a value '20' is assigned to NOB, and the value stored in NOB is assigned to LB.

At step 406, the set of buckets is truncated to generate a truncated dataset. In an embodiment of the invention, the set of equal-sized buckets is truncated from FB to LB. Further, the remaining buckets are temporarily discarded from the set of buckets. For example, in case the values stored in FB, LB, and NOB are equal to 1, 18 and 20 respectively, then the set of buckets is truncated from 1 to 18 to obtain a set of 18 buckets. Further, the buckets with numbers 19 and 20 are temporarily discarded from the set of buckets.

At step 408, the transformation statistic is calculated and stored. The transformation statistic is calculated after applying a transformation to the set of buckets. In an embodiment of the invention, the transformation may be, for example, a linear, logarithmic or square root transformation. In an embodiment of the invention, TranStat is calculated for the truncated dataset, as described in conjunction with FIG. 3. Further, the transformation statistic is stored along with the transformation for the set of buckets.

At step 410, it is checked whether the value stored in FB is equal to half of the value stored in NOB. In an alternative embodiment of the invention, the value stored in FB may be compared with a predetermined proportion of NOB. If the condition is true, then the generation of the transformations for the modeling variable is stopped. If the condition is false, then the generation of the transformations for the modeling variable is continued.

At step 412, it is checked whether the positive difference between the values stored in FB and LB is greater than half of the value stored in NOB. If the condition is false, then step 416 is performed, else the process is continued.

At step 414, the value stored in LB is decreased by one. Thereafter, step 406 is performed.

At step 416, the value stored in FB is increased by one. Further, the value stored in NOB is assigned to LB. Thereafter, step 406 is performed.

Figure 5:
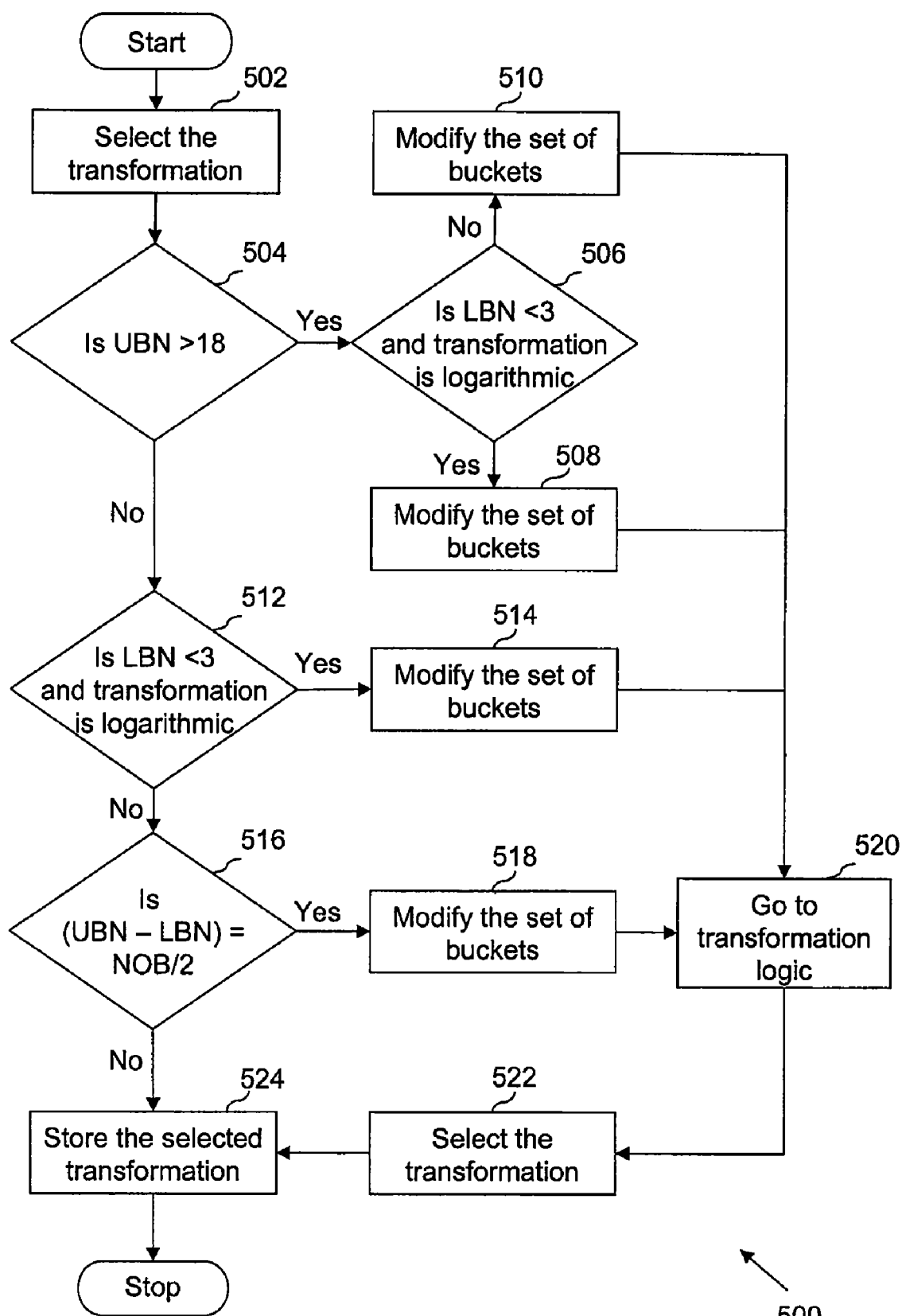
FIG. 5 is a flowchart illustrating a process for selecting a transformation, in accordance with an embodiment of the invention.

FIG. 5 is a flowchart illustrating a process for selecting a transformation, in accordance with an embodiment of the invention. In one embodiment, the process from step 502 to step 524 is carried out for all the modeling variables.

At step 502, one transformation is selected for each modeling variable from the plurality of transformations. In an embodiment of the invention, the transformations generated in FIG. 4 may be sorted in a descending order, based on the transformation statistic. In an embodiment of the invention, the transformations are sorted based on TranStat. After the sorting, the transformation with the highest value of TranStat is selected. Further, depending on the truncation buckets for the selected transformation, some counters are initialized. For example, if the selected transformation includes a set of 16 buckets with FB=3 and LB=18, then a value of three is assigned to the lower bucket number, LBN, and a value of 18 is assigned to the upper bucket number, UBN.

At step 504, it is checked whether the value stored in UBN is greater than (NOB−2). If the condition is false, then transfer the control to step 512, else the process is continued.

At step 506, two conditions are checked, i.e., the value of LBN and the type of transformation. If either the value stored in LBN is not less than three or the transformation is not logarithmic, then step 510 is performed. Otherwise, the process is continued.

At step 508, the set of buckets is modified. Each of the upper two buckets and the lower two buckets are split into twenty equal-sized buckets. The set of buckets is then truncated for LBN+2 and UBN−2. For example, in case NOB is equal to twenty, then the lower two buckets and the upper two buckets will be discarded from the set of buckets.

The lower two buckets are then replaced with twenty buckets obtained from splitting the lower two buckets. The upper two buckets are replaced with twenty buckets obtained by splitting the upper two buckets. The value stored in LBN, UBN, and NOB is reinitialized, based on the modification of the set of buckets. Thereafter, step 520 is performed.

At step 510, the set of buckets is modified. The lower two buckets are split into twenty equal-sized buckets. The set of buckets is truncated for (UBN−2). The lower two buckets are replaced with the twenty buckets obtained by splitting the lower two buckets. The values stored in LBN, UBN, and NOB are reinitialized based on the modification of the set of buckets. Thereafter, step 520 is performed.

At step 512, two conditions are checked, i.e., the value of LBN, and the type of transformation. If either the value stored in LBN is not less than three or the transformation is not logarithmic, then step 516 is performed. Otherwise, the process is continued.

At step 514, the set of buckets is modified. The upper two buckets are split into twenty equal-sized buckets. The set of buckets is truncated for LBN+2 and the upper two buckets are replaced with the twenty buckets obtained by splitting the upper two buckets. The value stored in LBN, UBN, and NOB is reinitialized, based on the modification of the set of buckets. Thereafter, step 520 is performed.

At step 516, it is checked if the positive difference between UBN and LBN is equal to half of the value stored in NOB. If the condition is false, then step 524 is performed. Otherwise, the process is continued.

At step 518, and the set of buckets is modified. In an embodiment of the invention, the set of buckets from LBN to UBN are split into twenty equal-sized buckets.

At step 520, the transformations are generated for the modified set of buckets. The transformations are generated by performing steps 406 to 416, as described in conjunction with FIG. 4. The counters are reinitialized by assigning the value stored in LBN to FB and by assigning the value stored in LBN to LB.

At step 522, one transformation is selected for the transformed modeling variable. In an embodiment of the invention, transformations may be sorted in a descending order based on the transformation statistic. In an embodiment of the invention, transformations are sorted, based on TranStat. After the sorting, the transformation with the highest value of TranStat is selected.

At step 524, the selected transformation for the transformed modeling variable is stored.

Figure 6:
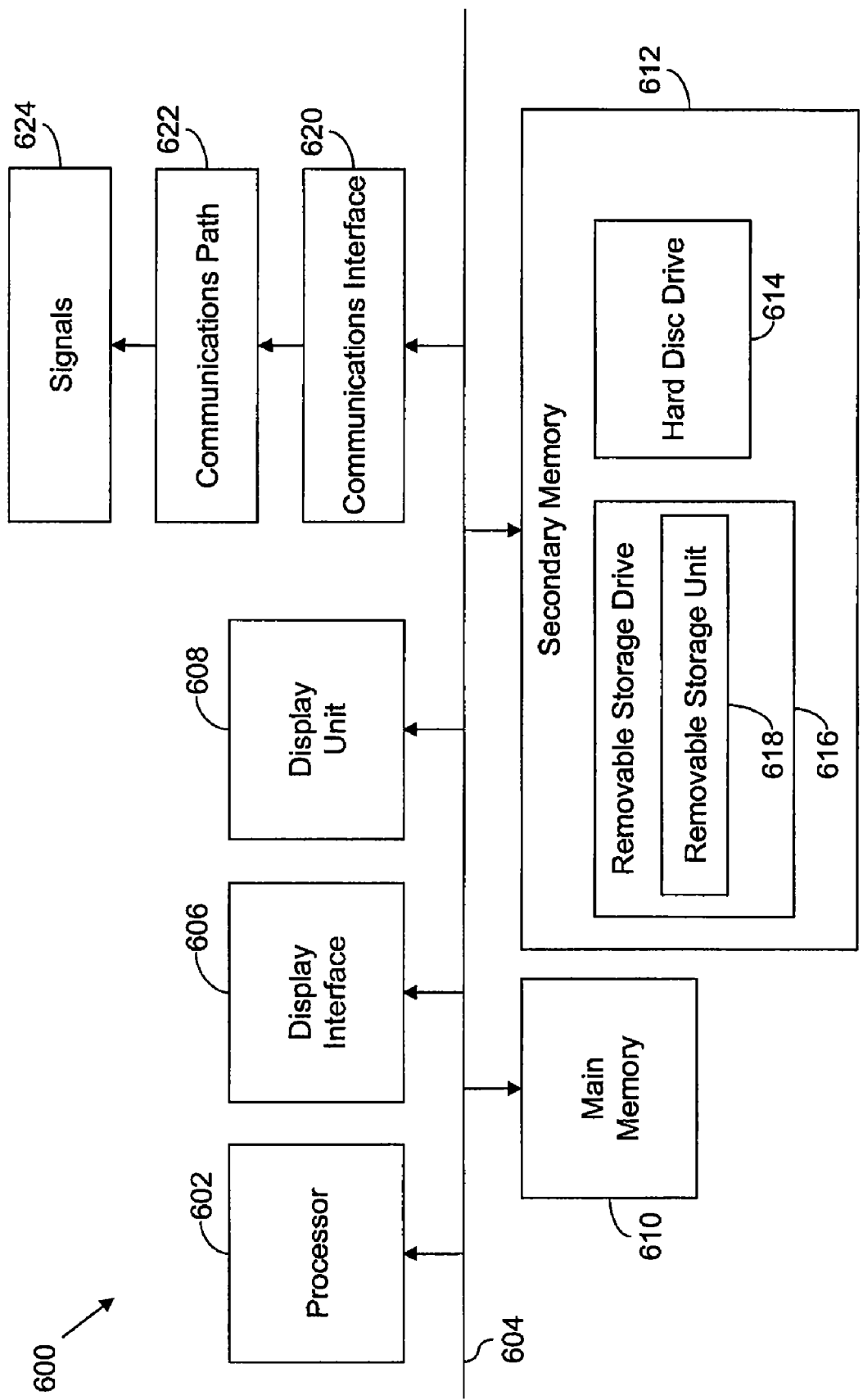
FIG. 6 is a block diagram of an exemplary computer system that is useful for implementing the invention.

FIG. 6 is a block diagram of an exemplary computer system that is useful for implementing the invention.

The present invention, i.e., system 100, process 200, system 300 or any part(s) or function(s) thereof, may be implemented by using hardware, software or a combination thereof, and may be implemented in one or more computer systems or other processing systems. However, manipulations performed by the present invention are often referred to in terms such as adding or comparing, which are commonly associated with the mental operations performed by a human operator. This capability of a human operator is unnecessary, or undesirable, in most cases, in any of the operations described herein, which form part of the present invention. On the contrary, all the operations are automated operations. Machines useful for performing the operations of the present invention include general purpose digital computers or similar devices. An example of a computer system 600 is shown in FIG. 6.

Computer system 600 includes one or more processors such as processor 602. Processor 602 is connected to a communication infrastructure 604, such as a communication bus, a cross-over bar or a network. Various software embodiments are described in terms of this exemplary computer system. After reading this description, it will become apparent to a person skilled in the relevant art(s) as to how the invention can be implemented by using other computer systems and/or architectures.

Computer system 600 can include a display interface 606 that forwards graphics, text, and other data from communication infrastructure 604 (or from a frame buffer that is not shown) for display on a display unit 608.

Computer system 600 also includes a main memory 610, preferably a random access memory (RAM), and may also include a secondary memory 612. Secondary memory 612 may include, for example, a hard disk drive 614 and/or a removable storage drive 616 representing a floppy disk drive, a magnetic tape drive, an optical disk drive, etc. Removable storage drive 616 reads from and/or writes to a removable storage unit 618 in a well-known manner. Removable storage unit 618 represents a floppy disk, a magnetic tape, an optical disk, etc., which is read by and written to by removable storage drive 616. As will be appreciated, removable storage unit 618 includes a computer-usable storage medium with stored computer software and/or data.

In alternative embodiments, secondary memory 612 may include other similar devices, enabling computer programs or other instructions to be loaded into computer system 600. Such devices may include, for example, a removable storage unit and an interface. Examples of these devices may include a program cartridge and a cartridge interface such as those found in video game devices, a removable memory chip such as an erasable programmable read-only memory (EPROM), or a programmable read only memory (PROM)) and an associated socket, as well as other removable storage units and interfaces, which enable software and data to be transferred from the removable storage unit to computer system 600.

Computer system 600 may also include a communications interface 620, which enables software and data to be transferred between computer system 600 and external devices. Examples of communications interface 620 may include a modem, a network interface such as an Ethernet card, a communications port, a Personal Computer Memory Card International Association (PCMCIA) slot and card, etc. Software and data transferred via communications interface 620 are in the form of signals 624, which may be electronic, electromagnetic, optical or other signals that are capable of being received by communications interface 620. These signals 624 are provided to communications interface 620 via a communications path 622 (e.g. channel). This communications path 622 carries signals 624 and may be implemented by using a wire or cable, fiber optics, a telephone line, a cellular link, a radio frequency (RF) link, and other communications channels.

In this document, the terms 'computer program medium' and 'computer-usable medium' are used to generally refer to media such as removable storage drive 616, a hard disk installed in hard disk drive 614, and signals 624. These computer program products provide software to computer system 600. The invention is directed at such computer program products.

Computer programs (also referred to as computer control logic) are stored in main memory 610 and/or secondary memory 612. These computer programs may also be received via communications interface 620. Such computer programs, when executed, enable computer system 600 to perform the features of the present invention, as discussed herein. In particular, the computer programs, when executed, enable processor 602 to perform the features of the present invention. Accordingly, such computer programs act as the controllers of computer system 600.

In an embodiment where the invention is implemented by using software, the software may be stored in a computer program product and loaded into computer system 600 by using removable storage drive 616, hard disk drive 614 or communications interface 620. The control logic (software), when executed by processor 602, causes processor 602 to perform the functions of the invention, as described herein.

In another embodiment, the invention is implemented primarily in hardware, using, for example, hardware components such as application-specific integrated circuits (ASICs). Implementation of the hardware state machine, to perform the functions described herein, will be apparent to persons skilled in the relevant art(s).

In yet another embodiment, the invention is implemented by using a combination of both hardware and software.

V. Conclusion

While various embodiments of the present invention have been described above, it should be understood that they have been presented by way of example and not limitation. It will be apparent to persons skilled in the relevant art(s) that various changes in form and detail can be made therein, without departing from the spirit and scope of the present invention. Thus, the present invention should not be limited by any of the above-described exemplary embodiments, but should be defined only in accordance with the following claims and their equivalents.

In addition, it should be understood that the figures illustrated in the attachments, which highlight the functionality and advantages of the present invention, are presented for exemplary purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly by a cursory inspection the nature and essence of the technical disclosure of the application. The Abstract is not intended to be limiting to the scope of the present invention in any way.

What is claimed is:

1. A method of predicting a future event associated with a business based on historical data associated with a model of past events of the business, comprising:
    obtaining, at a processor-based system, a plurality of modeling variables associated with the model, a dependent variable associated with the model and dependent on the plurality of modeling variables, and the historical data associated with the model;
    performing, using the processor-based system, a transformation of the plurality of modeling variables to obtain a linear relationship of each of the plurality of modeling variables in relation to the dependent variable;
    selecting, using the processor-based system, a subset of the plurality of transformed modeling variables, wherein the selecting comprises applying a selecting rule based on at least one of:
        (i) a correlation between a transformed variable and the dependent variable, and (ii) a proportion of a range of the dependent variable explained by the transformed variable; or
        a selection rule based on a log-likelihood difference;
    determining, using the processor-based system, a set of prediction variables, wherein the determining is based on a regression of the subset of the plurality of transformed variables; and
    generating, using the processor-based system, a predictive model using the prediction variables obtained from the regression, wherein the predictive model is used by the processing system to predict the future event.

2. The method of claim 1, further comprising:
    entering input, the input comprising at least one of the plurality of modeling variables, the dependent variable, or the historical data associated with the model.

3. The method of claim 1, further comprising:
    performing substitution of values in the historical data associated with the model, the substitution being performed for at least one of missing values, invalid values, or zero values.

4. The method of claim 1, wherein the transformation of the plurality of modeling variables is based on at least one of a correlation between a modeling variable of the plurality of modeling variables and the dependent variable, a proportion of range of the modeling variable utilized, and a proportion of range of the dependent variable that is explained by the modeling variable.

5. The method of claim 1, wherein selecting the subset of transformed modeling variables further comprises:
    clustering the transformed modeling variables for creating variable clusters; and
    selecting the set of variables from the variable clusters based on the selection rule.

6. The method of claim 1, wherein the regression of the subset of the plurality of transformed variables comprises performing stepwise regression of the subset.

7. The method of claim 1, wherein preparing the predictive model comprises at least one of modifying the predictive model, reviewing the transformation of the plurality of modeling variables, and validating the predictive model.

8. The method of claim 1, wherein applying a selecting rule based on a log-likelihood difference comprises determining a difference between a first model-fit statistic derived by utilizing an intercept model and a second model-fit statistic derived by utilizing an intercept-plus-covariate model.

9. A system for predicting a future event associated with a business based on historical data associated with a model of past events of the business, comprising:
    a processor; and
    a memory in communication with the processor, the memory storing a plurality of processing instructions for directing the processor to:
    obtain a plurality of modeling variables associated with the model, a dependent variable associated with the model and dependent on the plurality of modeling variables, and the historical data associated with the model;
    perform a transformation of the plurality of modeling variables to obtain a linear relationship of each of the plurality of modeling variables in relation to the dependent variable;
    select a subset of the plurality of transformed modeling variables, wherein the selecting comprises applying a selecting rule based on at least one of:
        (i) a correlation between a transformed variable and the dependent variable, and (ii) a proportion of a range of the dependent variable explained by the transformed variable; or
        a selection rule based on a log-likelihood difference;
    determine a set of prediction variables, wherein the determining is based on a regression of the subset of the plurality of transformed variables; and
    generate a predictive model using the prediction variables obtained from the regression, wherein the predictive model is used by the system to predict the future event.

10. The system of claim 9, further comprising instructions for directing the processor to:
    input at least one of the plurality of modeling variables, the dependent variable, or the historical data associated with the model.

11. The system of claim 9, further comprising instructions for directing the processor to:
   substitute at least one of a replacement value or a minimum value for at least one of missing values, invalid values, or zero values, the substitution being performed in the historical data.

12. The system of claim 9, further comprising instructions for directing the processor to:
   automatically cluster the transformed modeling variables; and
   select the set of variables from the variable clusters based on the selection rule.

13. The system of claim 9, wherein:
   the instructions to apply a selection rule based on a log-likelihood difference comprise instructions to determine a difference between a first model-fit statistic derived by utilizing an intercept model and a second model-fit statistic derived by utilizing an intercept-plus-covariate model.

14. A tangible computer readable medium having stored thereon computer executable instructions that, if executed by a computing device, cause the computing device to perform a method of predicting a future event associated with a business based on historical data associated with a model of past events of the business, the method comprising:
   obtaining, at a processor-based system, a plurality of modeling variables associated with a model, a dependent variable associated with the model and dependent on the plurality of modeling variables, and the historical data associated with the model;
   performing, using the processor-based system, a transformation of the plurality of modeling variables to obtain a linear relationship of each of the plurality of modeling variables in relation to the dependent variable;
   selecting, using the processor-based system, a subset of the plurality of transformed modeling variables, wherein the selecting comprises applying a selecting rule based on at least one of:
      (i) a correlation between a transformed variable and the dependent variable, and (ii) a proportion of a range of the dependent variable explained by the transformed variable; or
      a selection rule based on a log-likelihood difference;
   determining, using the processor-based system, a set of prediction variables, wherein the determining is based on a regression of the subset of the plurality of transformed variables; and
   generating, using the processor-based system, a predictive model using the prediction variables obtained from the regression, wherein the predictive model is used by the processing system to predict the future event.

15. The tangible computer readable medium of claim 14 having stored thereon the computer executable instructions that, if executed by the computing device, cause the computing device to perform the method that further comprises:
   enabling entering of at least one of the plurality of modeling variables, the dependent variable, or the historical data associated with the model.

16. The tangible computer readable medium of claim 14 having stored thereon the computer executable instructions that, if executed by the computing device, cause the computing device to perform the method that further comprises:
   substituting for missing values in the historical data associated with the model at least one of a minimum value of a modeling variable or a replacement value.

17. The tangible computer readable medium of claim 14 having stored thereon the computer executable instructions that, if executed by the computing device, cause the computing device to perform the method that further comprises:
   selecting a transformation based on a transformation rule.

18. The tangible computer readable medium of claim 14 having stored thereon the computer executable instructions that, if executed by the computing device, cause the computing device to perform the method that further comprises:
   performing clustering of the transformed plurality of modeling variables for creating variable clusters.

19. The tangible computer readable medium of claim 14 having stored thereon the computer executable instructions that, if executed by the computing device, cause the computing device to perform the method that further comprises:
   determining a difference between a first model-fit statistic derived by utilizing an intercept model and a second model-fit statistic derived by utilizing an intercept-plus-covariate model.

* * * * *